April 3, 1956　　　　W. R. CHAPMAN　　　　2,740,909
ELECTRIC DIFFERENTIAL TRANSMISSION
Filed June 9, 1953　　　　　　　　　　　　3 Sheets-Sheet 1
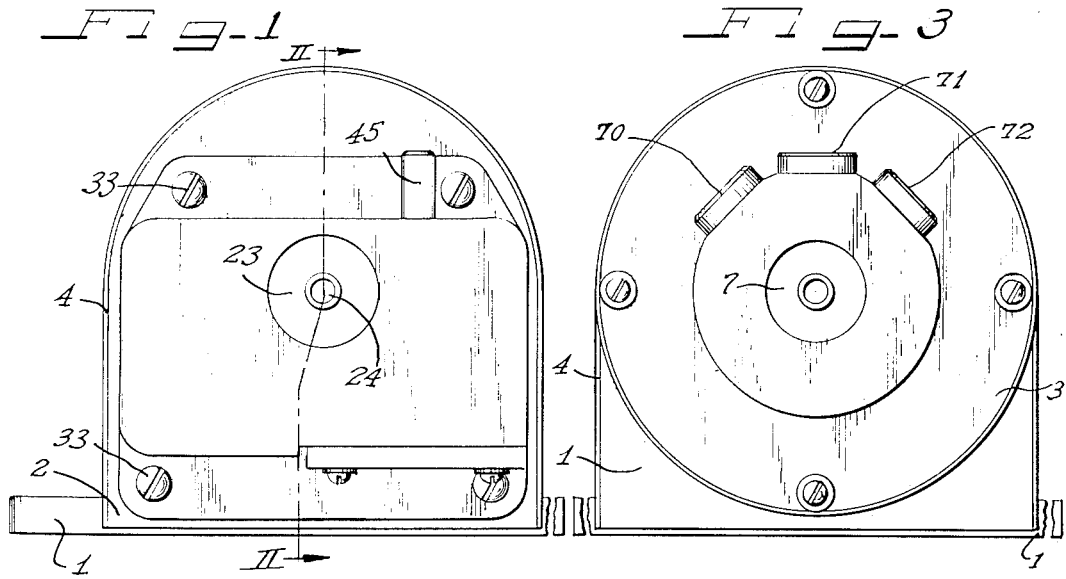
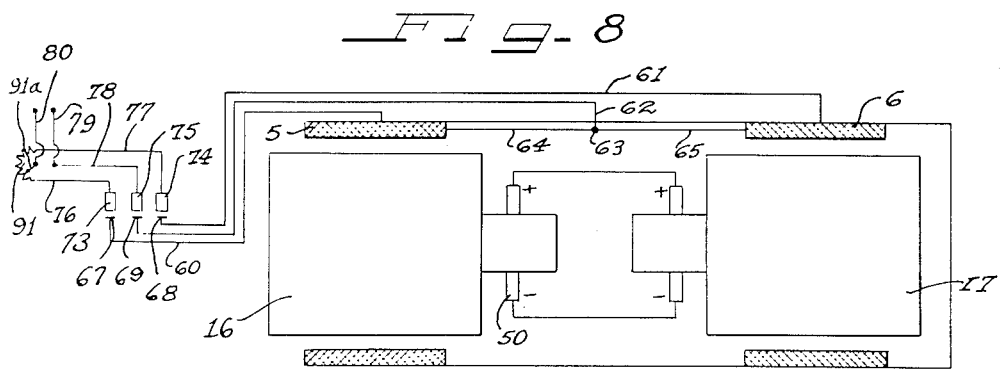
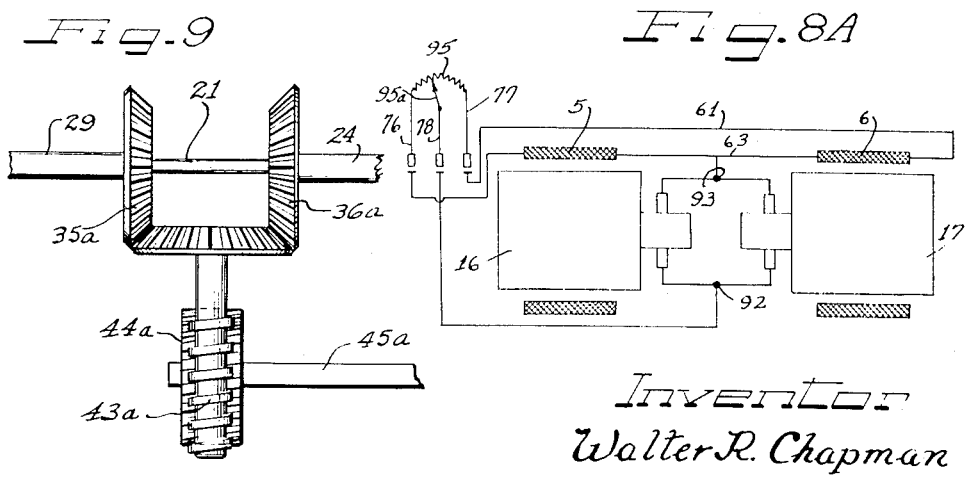
Inventor
Walter R. Chapman
by Hill, Sherman, Meroni, Gross & Simpson
Attys

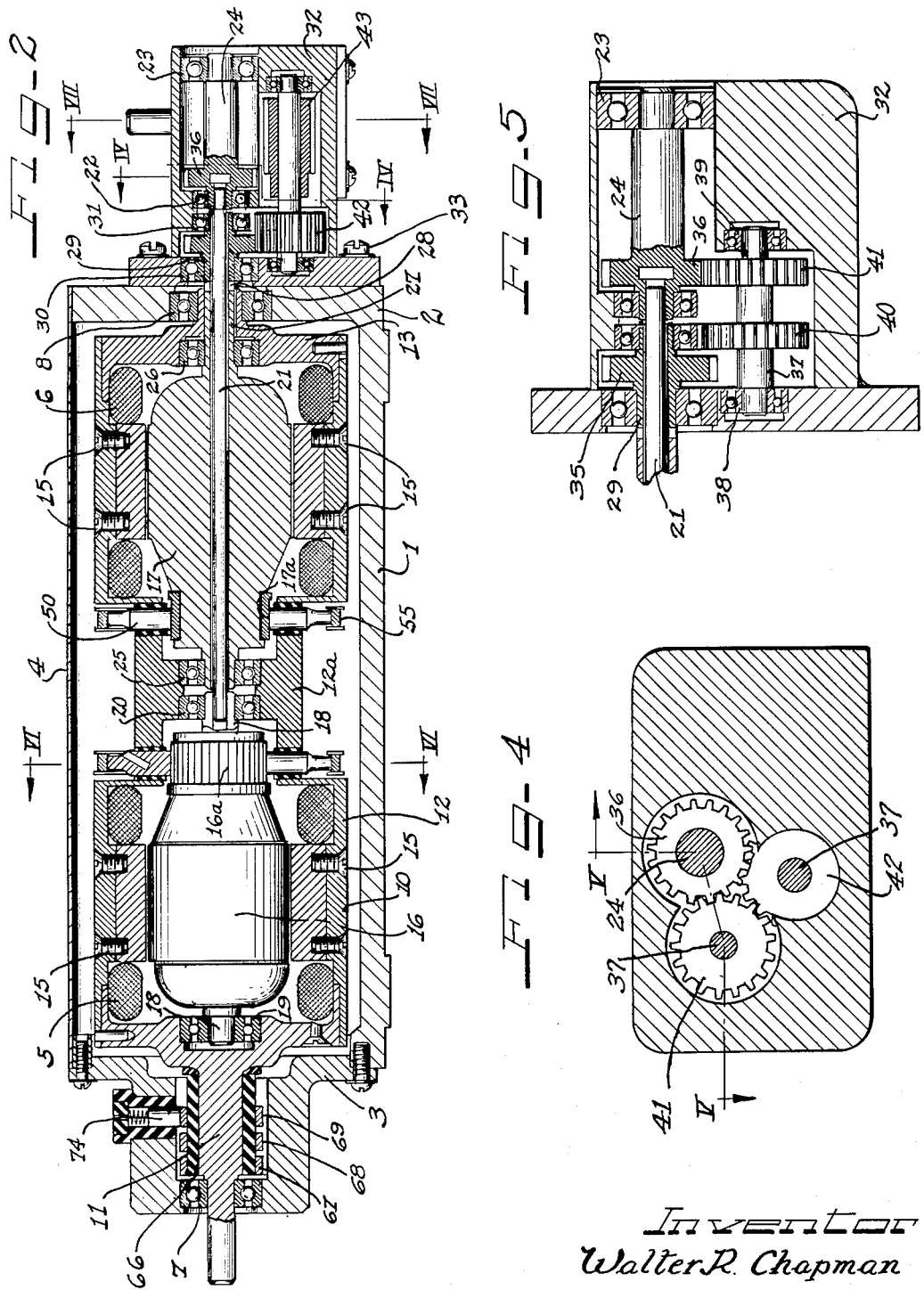

April 3, 1956      W. R. CHAPMAN      2,740,909
ELECTRIC DIFFERENTIAL TRANSMISSION
Filed June 9, 1953      3 Sheets-Sheet 3
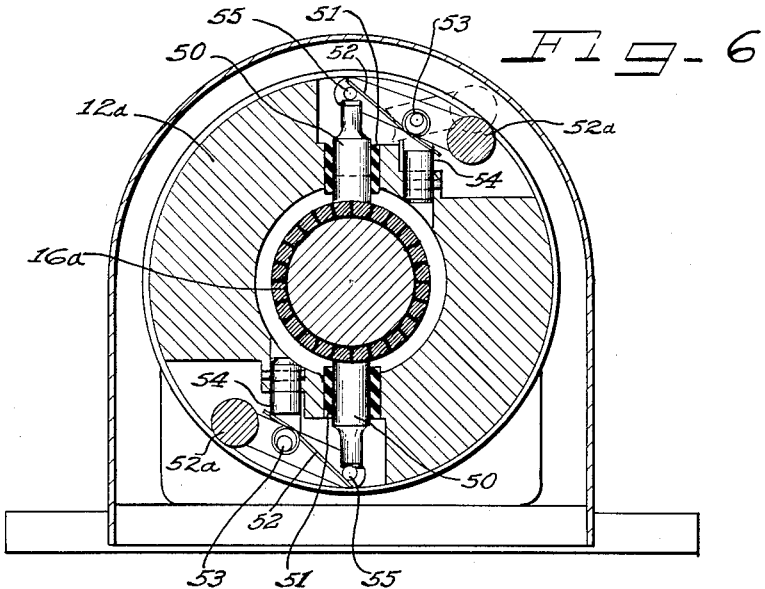
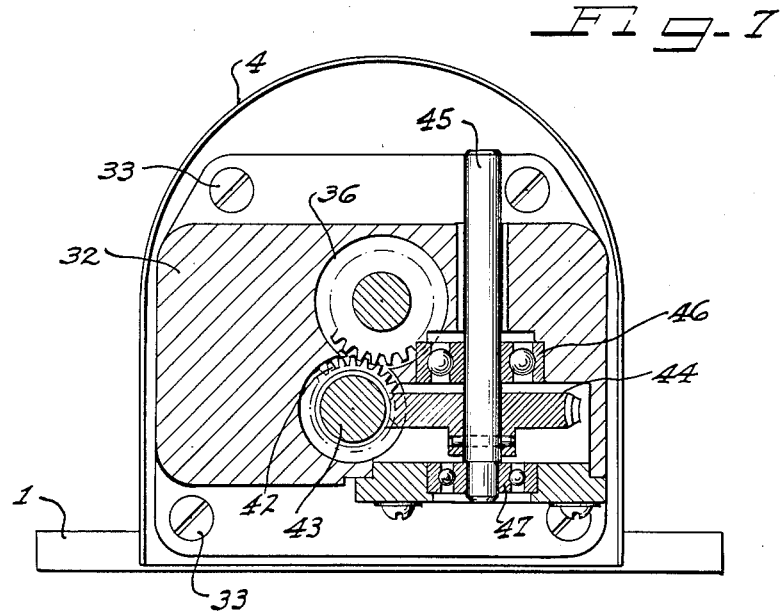
Inventor
Walter R. Chapman

United States Patent Office 2,740,909
Patented Apr. 3, 1956

2,740,909

ELECTRIC DIFFERENTIAL TRANSMISSION

Walter R. Chapman, Bedford, Ohio, assignor to Thompson Products, Inc., Cleveland, Ohio, a corporation of Ohio Application June 9, 1953, Serial No. 360,480

15 Claims. (Cl. 310—102)

This invention relates to a combined electrical-mechanical system for providing a controlled rotational output which will vary from zero through an infinite range to a maximum forward speed and from zero through a similar range to a maximum reverse speed without the use of change speed gearing or mechanical differential gearing. Specifically the apparatus of the present invention is constructed to transmit a uni-rotational input torque to an output shaft which rotates in one or the other directions depending upon an electrical control.

It is desirable in numerous fields that an input torque be modified and delivered to an oppositely rotating output shaft or to an output shaft capable of rotation in forward or reverse depending upon a control means. For example such an arrangement is useful in control systems such as those for steering systems as in marine vessels and aircraft. In such uses the system is particularly desirable since it is readily varied by extremely accurate sensing mechanism such as is normally utilized to operate a correcting influence. Such systems are generally referred to as servo control systems.

I am aware of course that mechanisms have been designed which will permit a uni-directional constant torque influence to be controlled by electrical means for the purpose of providing a reactive or corrective force in the control system. However, these systems are rather bulky and require mechanical differential gearing arranged between a plurality of electric control motors to provide the required control.

These general arrangements require the use of at least one, and usually more, differential gearing units of the mechanical sort with the control motor located at a position to put an input into the carrier or spider of the differential gearing to provide the control. This arrangement necessitates placing the motors in disaligned position with gearing between them, thereby causing a bulky servomechanism which is far more clumsy and space consuming than that desired for aeronautic purposes.

It is therefore an object of the present invention to provide an electro-mechanical servo differential unit which utilizes coaxially mounted control motors occupying a minimum space and requiring an absolute minimum of mechanical gearing and electrical wiring.

A further object of the present invention is to provide an electro-mechanical servo control mechanism which provides a differential action without utilizing mechanical planetary gearing.

Still another object of the present invention is to provide an extremely compact electro-mechanical servo unit which provides a differential action without conventional differential apparatus.

Yet another object of the present invention is the provision of an extremely accurately controllable reversible rotative output.

A further object of the present invention is the provision of a highly compact control unit which provides differential output.

Still a further object of the present invention is to provide an electro-mechanical power differential in which the power input, differential means and output may be coaxially positioned to occupy a minimum of lateral space.

Another object of the present invention is to provide a simplified differential unit utilizing the simplest mechanical as well as electrical components to provide an accurately controlled output.

Still other and further advantages will at once become apparent to those skilled in the art from the following description and annexed drawings in which one embodiment of the present invention is disclosed by way of illustration only.

On the drawings:

Figure 1 shows an end view of the apparatus of the present invention;

Figure 2 is a side elevational view in cross section taken along the lines II—II of Figure 1;

Figure 3 is an end view of the structure of the present invention taken from the end opposite that shown in Figure 1;

Figure 4 is a cross sectional view taken along the lines IV—IV of Figure 2;

Figure 5 is a cross sectional view showing the gearing utilized in the present invention and taken along the lines V—V of Figure 4;

Figure 6 is a cross sectional view taken along the lines VI—VI of Figure 2 and showing the armature brush arrangement utilized with the present invention;

Figure 7 is a view in partial cross section taken along the lines VII—VII of Figure 2 and further showing the gearing utilized in the present invention;

Figure 8 is a schematic diagram showing the electrical connections and circuits utilized in the apparatus of the invention.

Figure 8a is a modified form of the electrical circuit used with the invention; and Figure 9 is a diagrammatic view of a modification of the gearing used in the invention.

As shown on the drawings:

As may be clearly seen from Figure 2 of the drawings the apparatus of the present invention comprises an outer housing 1 having an integral end plate 2 and a removably secured end housing 3, all of which are appropriately covered by a sheet metal U-shaped covering 4.

A single rotating drum carrying a pair of field structures 5 and 6 is rotatably mounted within the housing by means of the bearings 7 and 8 positioned within the end walls 3 and 2 respectively. The drum 10 which supports the fields 5 and 6 is illustrated to be manufactured from a plurality of sections 11, 12 and 13. In this arrangement the members 11 and 13 comprise end walls and are machined to provide bearing races for supporting the drum within the housing 1 at the bearings 7 and 8.

It is of course anticipated that the drum structure 10 could be manufactured in various ways utilizing different numbers of parts and may be made of solid wall material or perforated for the circulation of cooling air if desired. While the central portion 12a is shown as being integral with the outer drum portions 12 it is of course contemplated that the central portion 12a may be a separate piece thereby permitting a simple drawing or cup shaped part to be used as the outer housing 12 if such a design simplification is desired.

The field coils 5 and 6 are securely fastened by means of screws or other similar fastening means 15 to the drum 10 for rotation therewith. They are connected electrically in a manner which will be described later.

Within the rotating field structure and supported by the drum 10 are mounted two direct current armatures 16 and 17 for association with the fields 5 and 6 respectively. The armature 16 is suspended by its shaft 18 in the bearing 19 located in the drum portion 11 and by the bearing 20 in the central portion 12a for rotation relative to the drum 10. Fixedly secured to the shaft 18 is an elongated driven shaft 21 which is maintained in alignment with the shaft 18 by means of the bearings 22 and 23 which support a take-off shaft 24 which is positively clutched to and supports the right end of the driven shaft 21 as viewed in Figure 2.

Concentrically mounted relative to the driven shaft 21 is the armature 17. The armature 17 is supported by the bearing 25 in the portion 12a and the bearing 26 in the end portion 13 of the drum 10. Integrally secured to the armature 17 is an extension shaft 27 which is positively clutched at 28 to a take-off sleeve shaft 29 which is supported for rotation relative to the fixed housing 2 by means of the bearings 30 and 31 mounted in the housing 32 which is fixedly secured by the bolts 33 to the end wall 2.

A consideration of this arrangement shows that the armatures 16 and 17 are thus free to rotate relative to one another within the field drum 10 and provide completely independent outputs at the driven shafts 24 and 29. However, these output shafts are, according to the present invention, geared together in such a manner to require the armatures to rotate in opposition to one another for reasons which will be discussed more fully below. In order to provide this counterrotation, gearing has been provided which will positively connect the shafts 24 and 29 for opposite rotation.

The gearing comprises a drive gear 35 secured to the shaft 29 and a second drive gear 36 of equal diameter and teeth as gear 35 secured to the shaft 24 which is in turn secured for rotation with the driven shaft 21. As is shown in Figure 5, an idler shaft 37 is mounted for rotation in the housing 32 by means of the bearings 38 and 39. The shaft 37 carries gears 40 and 41 secured thereto for rotation therewith. Gears 40 and 41 are of equal diameter and numbers of teeth to each other and to gears 35 and 36. Gears 41 and 36 are in mesh as shown in Figure 4 and hence shaft 37 and gear 40 rotate necessarily in a direction opposite to that of shaft 36. This construction requires therefore that the gear 40 which is directly driven by the shaft 21 and the gear 35 which is directly driven by the armature 17 to be rotated in opposite directions at the speed of the respective armatures 16 and 17.

These output gears 35 and 40 are correlated by the common driven gear 42 which is in mesh with both gears 35 and 40. As a result of this dual meshing, the gears 35 and 40 are required to rotate in direct opposition to each other with the net output being removed from the gear 42 through a worm gear 43, worm wheel 44 and final control shaft 45 which is mounted for rotation in the housing 32 by means of bearings 46 and 47.

From the above discussion describing the gearing arrangement utilized in the present invention it is clear that rotative torques applied in the same direction of rotation to the armatures 16 and 17 will be applied in opposition to each other in the output control shaft 45 and vice versa. It is therefore clear that when one armature acts as a motor and the other acts as a generator the rotative torques applied to the armatures 16 and 17 will be opposite but will through the gearing result in an additive torque being applied to the output control shaft 45 which is equal to the combined torque at the armatures. The means utilized in the present invention for varying the torque applied to the armatures 16 and 17 to provide this differential torque at shaft 45 will now be explained.

As explained above, the drum 10 is rotatably mounted within the outer fixed housing 1. In use, the shaft 11 is continuously driven at all times by any suitable source of power such as for example a commercial constant speed electric motor or other equivalent means. The D. C. armatures 16 and 17 are electrically connected in series opposition as shown in Figure 8 and are provided with brushes 50 which are slidably mounted in the non-conducting bushings 51 which are in turn press fitted or otherwise rigidly secured in the drum portion 12a. By placing the armature commutators 16a, and 17a in position facing each other as herein shown, an absolute minimum of wiring may be used thereby reducing electrical losses and assembly cost.

Pressure of the brushes upon the commutator surface is provided by means of the springs 52. Due to the fact that the drum 12a rotates, centrifugal weights 52a are provided for counterbalancing the weight of the brushes. The weights are pivotally secured at 53 to posts 54 which are rigidly secured to the drum 12a. Pins 55 cooperate with the ends of the brushes 50 to maintain them against the commutator 16a when the drum 10 is rotating and the weights 52a are urged radially outwardly by centrifugal force. While the weights 52a are not shown as adjustable, it is, of course, within the scope of the present invention to provide them with an adjustment means whereby the counterbalance force may be accurately set.

The fields 5 and 6 of the two dynamoelectric machines are electrically connected in series by conductors 64 and 65 across opposite ends of the potentiometer 91 through slip rings 67 and 68; brushes 73 and 74; and, conductors 76 and 77, respectively.

While several types of control are of course adaptable to the electro-differential of the present invention, a simple potentiometer circuit is here shown for purposes of illustration.

The potentiometer 91 includes a movable contact 91a which is connected to a conductor 80 which forms one side of a suitable direct current power supply line. The mid-point 63 in the electric circuit between coils 5 and 6 is connected through a conductor 62, slip ring 69, brush 75 and conductor 78 to a conductor 79 which forms the other side of the power supply line. The potentiometer 91 provides a voltage dividing means such that the voltage across the power supply line 80 may be divided equally across fields 5 and 6 and also provides an arrangement such that as the voltage across one field is increased, the voltage across the other field is correspondingly decreased.

In the form of the invention illustrated in Figure 2, the slip rings 67, 68 and 69 are mounted on a sleeve of dielectric material 66. As may be seen in Figures 2 and 3, the brushes 67, 68 and 69 are arranged in staggered relationship both axially and radially of the end wall housing member 3 in order to reduce the amount of space which would otherwise be required. The brushes are mounted in dielectric bushings 70, 71 and 72 to insulate them from the housing plate 3.

The movable contact 91a of the potentiometer 91 is preferably arranged to actuate in response to a control signal or other adjusting means. It will of course, be appreciated that while voltage dividing network has been shown in the form of a potentiometer 91, such a specific arrangement is not necessary to the system since any means may be employed which provides variation in one or both of the fields to provide a differential output drive at 45. The particular voltage dividing arrangement herein shown, however, has proved simple and effective.

In Figure 8a a modified arrangement is provided in which the fields 5 and 6 are self excited, rather than separately excited. There, the fields 5 and 6 are connected across the respective armatures 16 and 17, as at 92 and 93. A potentiometer 95 is connected across the serially connected fields 5 and 6. The movable contact 95a of the potentiometer 95 is connected to one side of the armature circuit at 92 and the midpoint 63 between the fields 5 and 6 is connected to the other side of the armature circuit at 93.

In operation, the modifications shown in Figures 8 and 8a are substantially the same. Assuming that the field currents flowing in the fields 5 and 6 are equal, no torque will be impressed upon the armatures, since the D. C. armatures 16 and 17 are connected electrically in series opposition and no current will flow in the armature circuit. Under such circumstances there will be no rotation of the output shaft in either direction and the control surface or other controlled element which is under the influence of the rotatable shaft 45 will remain stationary in a balanced condition.

Assuming, on the other hand, that the field 5 is strengthened and the field 6 correspondingly diminished by adjustment of the potentiometer 91 or 95 the armature 16 and field 5 will operate as a dynamo and current will flow in the armature circuit to operate the armature 17 as a motor and apply a rotational tendency in the reverse direction in the armature 17 from that of the armature 16. These reverse torques will be added through the gearing to thereby act in unison at gear 43.

This torque may be utilized through the control shaft 45 to modify the position of a controlled surface or to drive other mechanism at a differential speed. It is understood, of course, that an opposite control at the potentiometer 91 or 95 feeding the field inlets 76 and 77 will cause the field strength of the coil 6 to be greater than that of 5 with a resultant reversal of the output torque and hence a reversal in direction of rotation at the control shaft 45.

The net result of the above described operation of the apparatus of the present invention is that a smoothly variable rotational output is obtainable at the control shaft 45 such that the shaft 45 is capable of rotating in either direction up to a maximum speed equal to the maximum difference in speed between the armature and field of the armature and field acting as a motor. This apparatus may thus be operated as a motor having a maximum output torque equal to the maximum torque of the armature field combination, and it may be operated in either direction with these maximums dropping to zero speed and zero torque when the fields are of equal strength and no torque is developed in the armatures.

This system provides an extremely smooth and accurate control which requires no mechanical differential gearing with its resultant increase in mechanical friction loses, and which also provides high efficiency. This latter is due to the fact that the system is regenerative in nature at all speeds.

A further great improvement found in the present invention is the simplicity and compactness of design. As may be appreciated from a consideration of Figures 1 and 2, the apparatus of the present invention provides a space efficiency of very nearly one hundred percent. The necessary field and armatures are arranged to provide a minimum housing or space requirement. In view of the arrangement of parts it is clear, that the input drive motor (not shown), which is provided for rotating the fields drum 10 at the shaft 11 may add to the length of the apparatus but need not require any more space in the diametric dimension. This is particularly desirable in aircraft work where narrow spaces are very frequently confronted, such as for example in wing and other control surfaces.

While straight spur gear reversing mechanism has been shown it is contemplated that other types of reverse gearing may be employed. For example as shown in Fig. 9 the gears 35 and 36 may be modified to form beveled gears 35a, 36a which cooperate with a driven bevel pinion 42a rotating on an axis at right angles to that of the shaft 21 and intermediate the gears 35a and 36a. Such gearing could of course be of the straight bevel or hypoid type and the output from the driven bevel pinion 42a could of course then be fed through reduction gearing of the worm type shown at 43a, 44a if desired. This latter arrangement would permit the use of a final output shaft 45a which would rotate on an axis parallel to the axis of the shaft 21, or even coaxial therewith if reduction gears of the spur type were utilized.

It is clear from the above disclosure that I have developed a novel and extremely simple, as well as a highly efficient electro-mechanical differential unit which will provide a differential output to a control shaft from a single constant speed input without the use of a mechanical planetary differential gearing. It further provides the maximum in compactness thereby greatly increasing the fields of usefulness of such a device. Its compact nature permits ready weather proofing in a very simple manner since the cover required such as for example at 4 is very simple and of minimum dimension.

It will of course be understood that various details of construction may be varied through a wide range without departing from the principles of this invention and it is therefore not the purpose to limit the patent granted hereon otherwise than necessitated by the scope of the appended claims.

I claim as my invention:

1. In an electro-mechanical differential unit, a first rotating field coil, a second rotating field coil coaxially mounted with respect to said first field coil and connected thereto for rotation therewith, first armature means mounted for rotation within said first field coil, second armature means mounted for rotation within said second field coil and coaxial with said first armature, said armatures being electrically connected in series opposition, means associated with said armatures for mechanically connecting them for rotation in opposite directions, and means associated with said last named means for driving an output shaft from said reversing means with a differential speed varying with relative values of the field currents of said first and second field coils.

2. In an electro-mechanical mechanism, a rotating drum, first and second field coils associated with said drum and axially spaced from each other, first and second armatures rotatably mounted within said drum and associated respectively with said first and second field coils, said armatures being coaxially positioned, first gear means associated with said first armature for rotation therewith, second gear means associated with said second armature for rotation therewith, idler gear means rotatably mounted in a fixed pivot and associated with said second gear means, and third gear means driven by said first gear means and said idler gear means whereby said first gear and said second gear are limited to rotation in opposite directions relative to one another and means associated with said third gear and connected to a final output shaft for connection to a load, means for adjusting the relative strength of said first and second field coils and said first and second armatures being electrically connected in series opposition whereby adjustment of said field strengths relative to one another will cause a differential speed to be applied to said final output shaft.

3. In an electro-differential mechanism, a housing, a drum rotatably mounted within said housing means for rotating said drum, first and second field coils mounted coaxially with and for rotation with said drum means for adjusting the relative strength of said field coils, first and second armatures supported for rotation within said drum coaxially therewith, first gear means connected to said first armature for rotation therewith, second gear means connected to said second armature for rotation therewith, third gear means rotatably supported in said fixed housing for connecting said first and second gears to a fourth gear in opposition, said fourth gear means being connected to an output load and means for connecting said armatures electrically in series opposition whereby a differential output is obtained at said third gear in response to differential control of the relative values of said first and second field coils during rotation of said drum.

4. In an electro-differential mechanism, a housing, a drum rotatably mounted within said housing, first and second field coils mounted coaxially with and for rotation with said drum, first and second armatures supported for rotation within said drum coaxially therewith, first gear means connected to said first armature for rotation therewith, second gear means connected to said second armature for rotation therewith, third gear means rotatably supported in said fixed housing for connecting said first and second gears to a fourth gear in opposition, said fourth gear means being connected to an output load and said armatures being electrically connected in series opposition, and said first armature being connected to said first gear by means of a shaft extension concentrically mounted for rotation within said second armature and second gear.

5. An electro-differential mechanism comprising a fixed housing, a drum rotatably mounted within said housing, means for rotating said drum, first and second field coils mounetd fixedly within said drum for rotation therewith about the axis of rotation thereof, first direct current armature means mounted for rotation in said drum, an output shaft coaxial with the axis of said drum and secured to said armature and having first gear means fixedly secured thereto, second direct current armature means rotatably mounted within said drum and concentric to said shaft, a sleeve shaft secured to said second armature and second gear means secured to said sleeve shaft around said output shaft whereby said first and second gears are positioned at one end of said drum.

6. An electro-differential mechanism comprising a fixed housing, a drum rotatably mounted within said housing means for rotating said drum, first and second field coils mounted fixedly within said drum for rotation therewith about the axis of rotation thereof, first direct current armature means mounted for rotation in said drum, an output shaft coaxial with the axis of said drum and secured to said armature and having first gear means fixedly secured thereto, second direct current armature means rotatably mounted within said drum and concentric to said shaft, a sleeve shaft secured to said second armature and second gear means secured to said sleeve shaft around said output shaft whereby said first and second gears are positioned at one end of said drum and reversing gear means rotatably mounted in fixed position and in connection with said first and second gears for connecting said armatures for rotation in opposition.

7. An electrical differential unit comprising means providing first and second field coils connected for simultaneous mechanical rotation in the same direction, means for rotating said field coils, first and second direct current armatures mounted for rotation within said first and second field coils, and mechanical means inter-connecting said armatures requiring them to rotate in opposite directions relative to a fixed housing.

8. An electrical differential unit comprising means for providing first and second field coils connected in coaxial alignment for simultaneous mechanical rotation in the same direction, means for rotating said field coils, first and second direct current armatures mounted for rotation within said first and second field coils respectively, and, mechanical means interconnecting said armatures requiring them to rotate in opposite directions relative to a fixed housing.

9. An electrical differential unit comprising means providing first and second field coils connected for simultaneous mechanical rotation in the same direction, means for rotating said field coils, first and second direct current armatures mounted in axial alignment for rotation within said first and second field coils respectively, shaft means extending from one end of said first armature, through said second armature to an output gear, a sleeve shaft extending from said second armature to a second gear positioned around said first shaft and means interconnecting said gears for rotation with said first and second armatures and providing means interconnecting said armatures requiring them to rotate in opposite directions relative to a fixed housing.

10. An electrical differential unit comprising means providing first and second separately variably excited field coils connected for simultaneous mechanical rotation in the same direction, means for rotating said field coils, first and second direct current armatures mounted for rotation within said first and second field coils respectively, mechanical means interconnecting said armatures requiring them to rotate in opposite directions relative to a fixed housing and means connecting said armatures electrically together in series opposition.

11. An electrical differential unit comprising a rotating drum, means providing first and second field coils secured in said drum for rotation therewith, first and second direct current armatures rotatably mounted within said respective fields, the commutators of said armatures facing each other in coaxial alignment, first and second gear means secured for rotation with said respective armatures and positioned at one end of said rotating drum, and output gear means associated with said first and second gears requiring them to rotate in opposite directions.

12. An electrical differential unit comprising a rotating drum, means providing first and second differentially excited field coils in said drum for rotation therewith, first and second direct current armatures rotatably mounted within said respective field coils, the commutators of said armatures facing each other in coaxial alignment, first and second gear means secured for rotation with said respective armatures and positioned at one end of said rotating drum, and output gear means associated with said first and second gears requiring them to rotate in opposite directions.

13. An electrical differential unit comprising a rotating drum, means providing first and second differentially excited field coils in said drum for rotation therewith, first and second direct current armatures rotatably mounted within said respecting field coils, the commutators of said armatures facing each other in coaxial alignment, means electrically connecting said armatures in series opposition, first and second gear means secured for rotation with said respective armatures and positioned at one end of said rotating drum, and output gear means associated with said first and second gears for causing them to rotate in opposite directions.

14. An electrical differential unit comprising a rotating drum, means providing first and second differentially excited field coils in said drum for rotation therewith, first and second direct current armatures rotatably mounted within said respecting field coils, the commutators of said armatures facing each other in coaxial alignment, means electrically connecting said armatures in series opposition, first and second gear means secured for rotation with said respective armatures and positioned at one end of said rotating drum, and output gear means associated with said first and second gears, and mounted for rotation about a fixed axis for requiring them to rotate in opposite directions.

15. An electrical differential unit comprising a rotating drum, means providing first and second differentially excited field coils in said drum for rotation therewith, first and second direct current armatures rotatably mounted within said respecting field coils, the commutators of said armatures facing each other in coaxial alignment and being electrically connected in series opposition, first and second gear means secured for rotation with said respective armatures and positioned at one end of said rotating drum, and output gear means associated with said first and second gears, and mounted for rotation about a fixed axis for requiring them to rotate in opposite directions, said output gear means being connected to a second rotatably mounted output shaft connected to a load to be controlled.

References Cited in the file of this patent

UNITED STATES PATENTS

| 1,266,576 | Fraser | May 21, 1918 |

FOREIGN PATENTS

| 641,208 | Germany | Jan. 23, 1937 |